(12) United States Patent
Green

(10) Patent No.: US 11,117,602 B2
(45) Date of Patent: Sep. 14, 2021

(54) HEIGHT ADJUSTABLE HANDLES FOR WHEELBARROWS

(71) Applicant: Ivan L. Green, Farmington Hills, MI (US)

(72) Inventor: Ivan L. Green, Farmington Hills, MI (US)

( * ) Notice: Subject to any disclaimer, the term of this patent is extended or adjusted under 35 U.S.C. 154(b) by 29 days.

(21) Appl. No.: 16/607,959

(22) PCT Filed: May 4, 2018

(86) PCT No.: PCT/US2018/031131
§ 371 (c)(1),
(2) Date: Oct. 24, 2019

(87) PCT Pub. No.: WO2018/204813
PCT Pub. Date: Nov. 8, 2018

(65) Prior Publication Data
US 2021/0101631 A1     Apr. 8, 2021

Related U.S. Application Data

(60) Provisional application No. 62/501,429, filed on May 4, 2017, provisional application No. 62/509,319, filed on May 22, 2017.

(51) Int. Cl.
*B62B 1/20* (2006.01)
*B62B 5/06* (2006.01)

(52) U.S. Cl.
CPC ............... *B62B 1/20* (2013.01); *B62B 5/062* (2013.01)

(58) Field of Classification Search
CPC .. B62B 1/18; B62B 1/20; B62B 5/062; B62B 5/064
See application file for complete search history.

(56) References Cited

U.S. PATENT DOCUMENTS

| | | | | |
|---|---|---|---|---|
| 772,253 A | * | 10/1904 | Ray | B62B 1/18 280/47.31 |
| 1,407,690 A | * | 2/1922 | Berry | B62B 1/20 280/47.16 |

(Continued)

OTHER PUBLICATIONS

International Search Report for International Application No. PCT/US2018/031131, Filed May 4, 2018.

*Primary Examiner* — Brian L Swenson
(74) *Attorney, Agent, or Firm* — Warn Partners, P.C.

(57) ABSTRACT

A wheelbarrow having an adjustable handle. The wheelbarrow has a bucket portion having a pair of sides and an axle accepting portion therein. An axle member is provided for insertion through the axle engagement member. The axle member has a pair of outer peripheral ends spaced on either side of the pair of sides. A pair of handles are pivotally attached to each of the pair of outer peripheral ends for allowing the handle to pivot away from the bucket portion of the wheelbarrow. Each side of the wheelbarrow has surfaces defining a plurality of handle engaging areas such that the handle may selectively be engaged in an area at a first position and selectively disengaged to move the handle to a second position. Each handle has a handle end portion which includes grip portions corresponding to the number of positions for the handles wherein each grip portion is configured at an angle for being substantially parallel to the ground when in a corresponding position in a selected corresponding slot in the wheelbarrow.

20 Claims, 6 Drawing Sheets

(56) References Cited

U.S. PATENT DOCUMENTS

| | | | | |
|---|---|---|---|---|
| 2,824,748 | A | * | 2/1958 | Schoenberger ............ B62B 1/20 280/47.26 |
| 5,313,817 | A | | 5/1994 | Meinders |
| 5,915,706 | A | * | 6/1999 | Mosley ..................... B62B 1/20 280/47.26 |
| 6,186,523 | B1 | * | 2/2001 | Aielli ....................... B62B 1/20 280/47.31 |
| 2003/0178801 | A1 | * | 9/2003 | Hart ...................... B62B 5/0026 280/47.371 |
| 2003/0218305 | A1 | * | 11/2003 | Nicolay .................... B62B 5/06 280/47.31 |
| 2011/0260420 | A1 | | 10/2011 | Volin |
| 2013/0062844 | A1 | * | 3/2013 | Stevens ..................... B62B 1/06 280/47.26 |
| 2016/0137214 | A1 | | 5/2016 | Mkhize |
| 2020/0283987 | A1 | * | 9/2020 | Huffman .................. E02F 3/02 |

\* cited by examiner

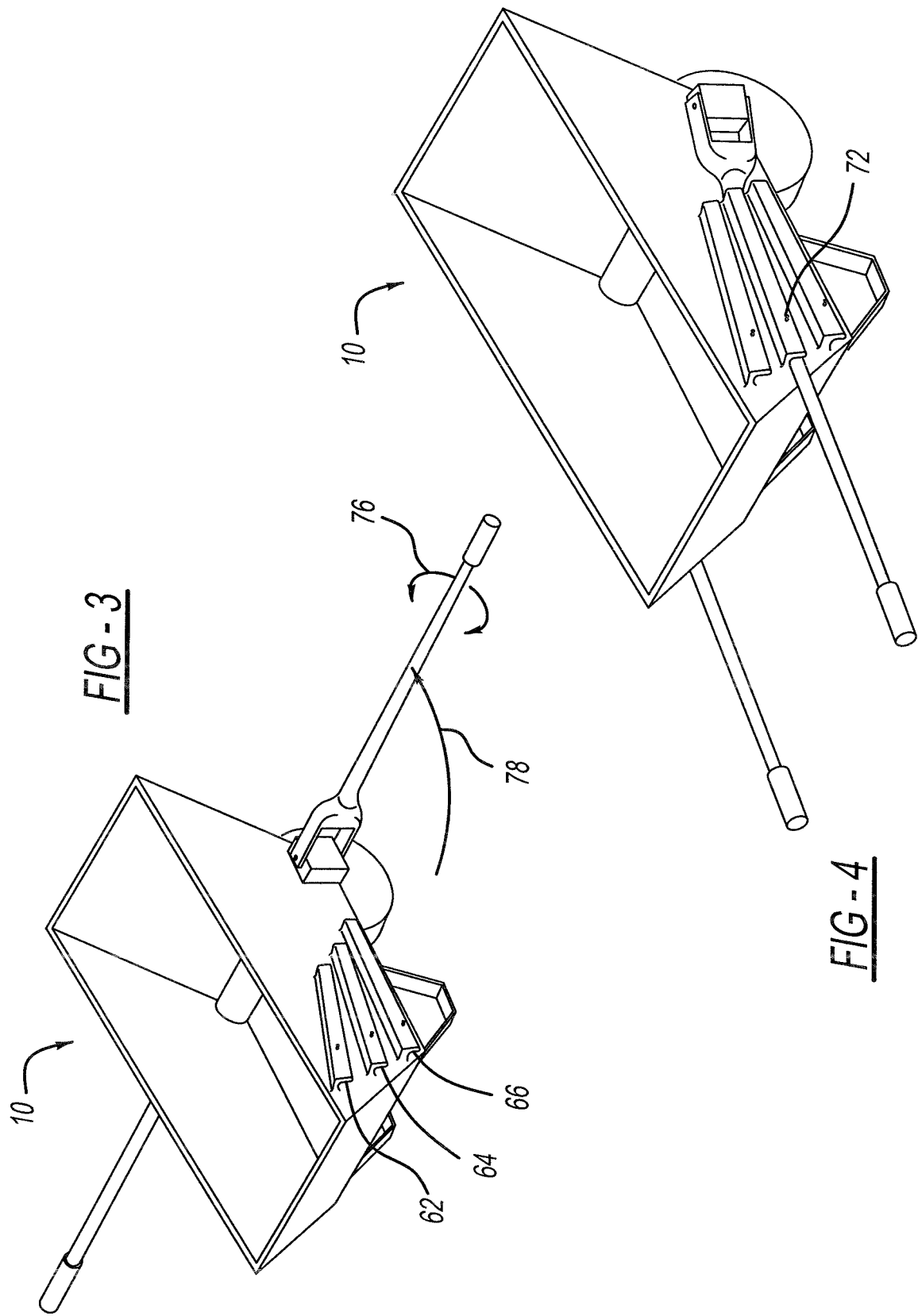

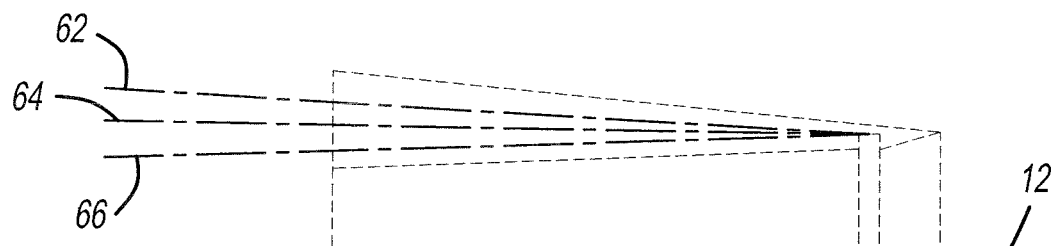
FIG-5
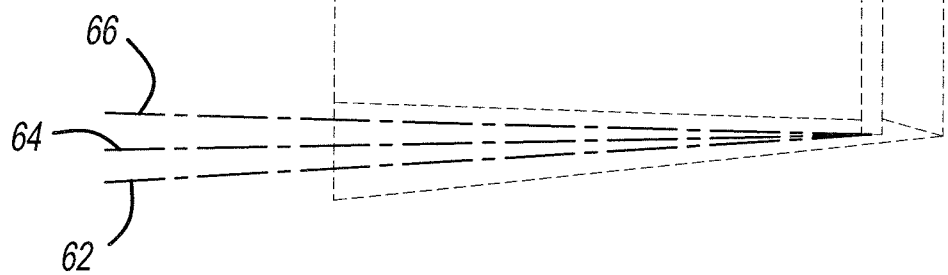
FIG-6
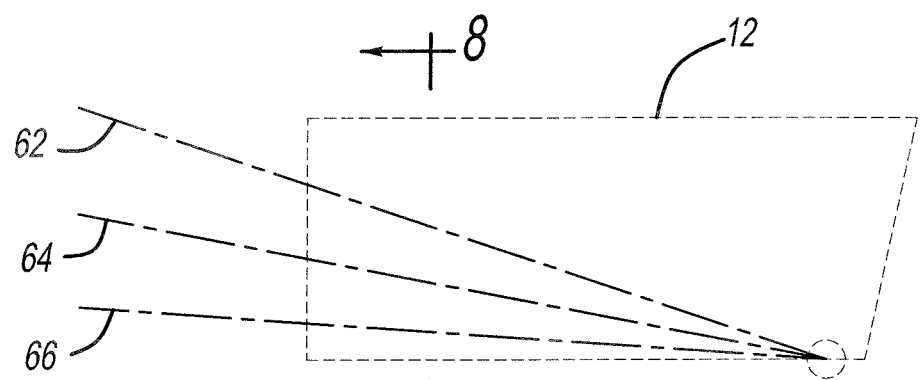
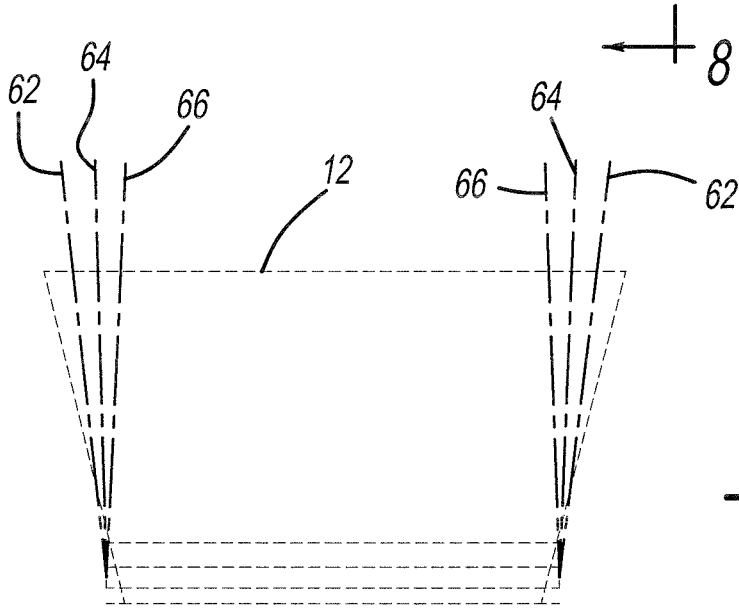
FIG-7

HEIGHT ADJUSTABLE HANDLES FOR WHEELBARROWS

CROSS-REFERENCE TO RELATED APPLICATIONS

This application is a National Stage of PCT International Application No. PCT/US2018/031131, filed May 4, 2018, claims the benefit of U.S. Provisional Application No. 62/501,429, filed May 4, 2017, and U.S. Provisional Application No. 62/509,319, filed May 22, 2017. The disclosures of the above applications are incorporated herein by reference.

TECHNICAL FIELD

The present invention relates to garden carts and related apparatuses commonly referred to as wheelbarrows. More particularly the present invention relates to an adjustable height handle for a garden cart or wheelbarrow. The word "wheelbarrow" as used herein refers to garden carts or classic wheelbarrows.

BACKGROUND OF THE INVENTION

The wheelbarrow is a relatively ancient implement or vehicle for moving small to medium loads by human power. A "classic" wheelbarrow includes a V-shaped frame formed by angularly connected side members or shafts terminating in handles at their outer ends. A single wheel is journaled near the vertex of the V-shaped frame, and rear skids extend below the shafts at medial positions to form a platform which supports a load carrying pan, also called a tub, trough, bucket, or hopper. The user stands between the handles, lifts them, and walks toward the barrow, pushing the handles, to move the load. The single wheel facilitates turns. The pan is sometimes deeper at the front end than the rear to proportion more of the weight of the load over the wheel, thereby reducing the effective weight on the handles. Wheelbarrows are particularly useful for moving loads of loose bulk materials and dumping the loads, by tilting the handles up and pivoting the load about the wheel axle. In the more recent times a modification to the classic wheelbarrow has been provided by garden carts that typically have a more rectangular shaped body with an axle with duel wheels journaled at a front end. Typically the garden cart also has a deeper front end.

There have been many variations of wheelbarrows devised throughout the years and many improvements made to correct various shortcomings of wheelbarrows. One particular problem with classic wheelbarrows is the proximity of the handles to the ground. This requires that a user stoop to reach the handles, then lift the handles a considerable distance to move the wheelbarrow and any load therein. Such stooping may result in back injuries, if the handles are not lifted properly. Another problem is that the handles are usually fixed in place, such that tall users are particularly disadvantaged in using such wheelbarrows. In order to overcome these problems, wheelbarrow handles have been repositioned, reshaped, and connected in various ways to improve grasping the handles and carrying them to move the wheelbarrows.

SUMMARY OF THE INVENTION

A wheelbarrow having an adjustable handle is provided. In one preferred embodiment the wheelbarrow has a bucket portion having a pair of sides. A pair of handles are pivotally attached to the bucket portion for allowing the handle to pivot away from the bucket portion of the wheelbarrow. Each side of the wheelbarrow has surfaces defining a plurality of handle engaging areas such that the handle may selectively be engaged in an area at a first position and selectively disengaged to move the handle to a second position. Optionally, each handle may have a handle end portion which includes grip portions corresponding to the number of positions for the handles wherein each grip portion is configured at an angle for being substantially parallel to the ground when in a corresponding position in a selected corresponding slot in the wheelbarrow.

The drawings constitute a part of this specification, include exemplary embodiments of the present invention, and illustrate various objects and features thereof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view showing the handle in the disengaged for adjustment position;

FIG. 4 is a perspective view similar to FIG. 1 showing the handle in a second height position;

FIG. 5 is a schematic top view showing the handle position in a preferred embodiment of the invention;

FIG. 6 is a schematic side view showing the handle position in a preferred embodiment of the invention;

FIG. 7 is a schematic rear view showing the handle position in a preferred embodiment of the invention;

DETAILED DESCRIPTION OF THE PREFERRED EMBODIMENTS

Figure 1:
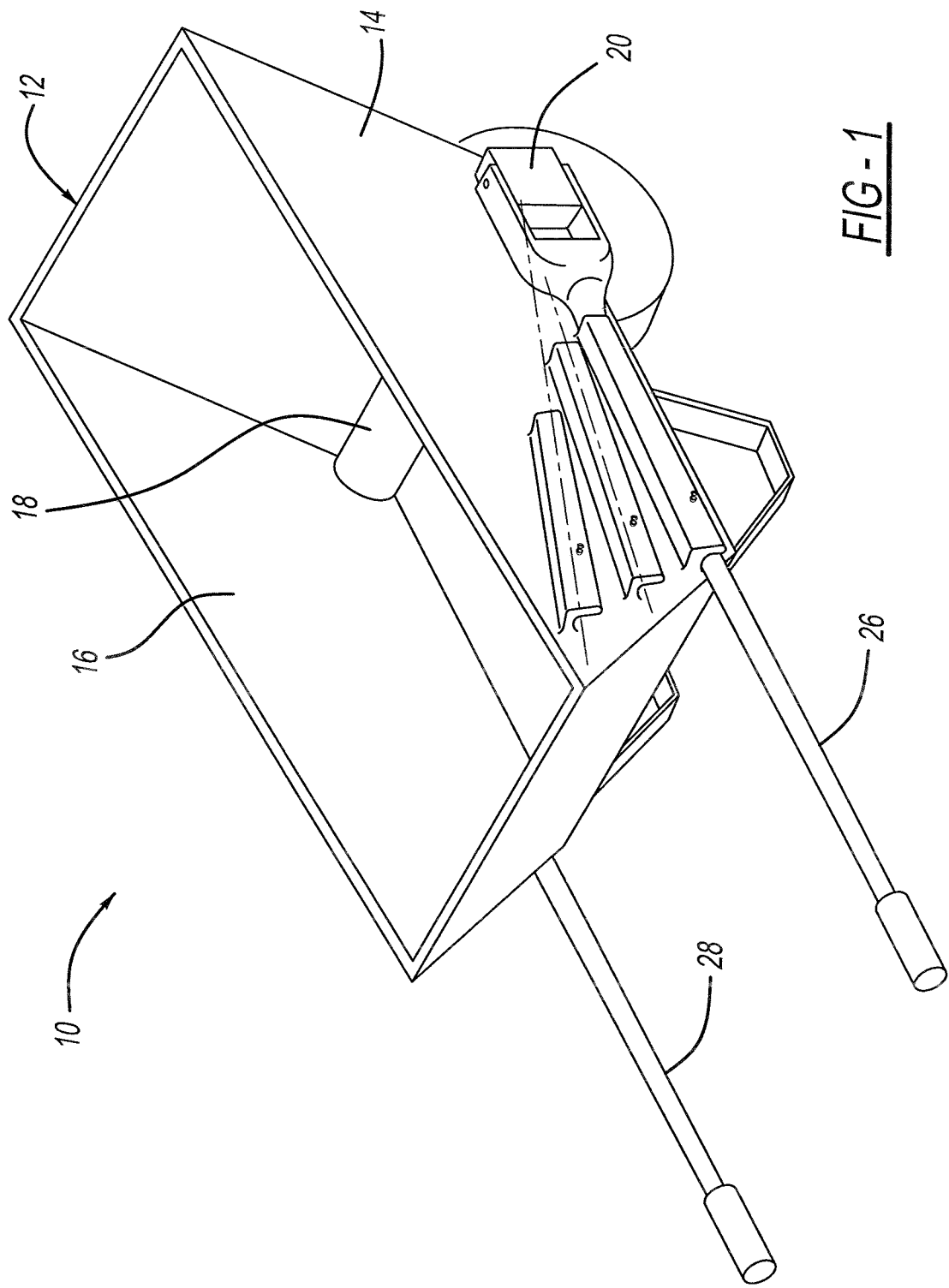
FIG. 1 is a perspective view showing a preferred embodiment adjustable handle wheelbarrow in accordance with the teachings of the present invention.
Figure 2:
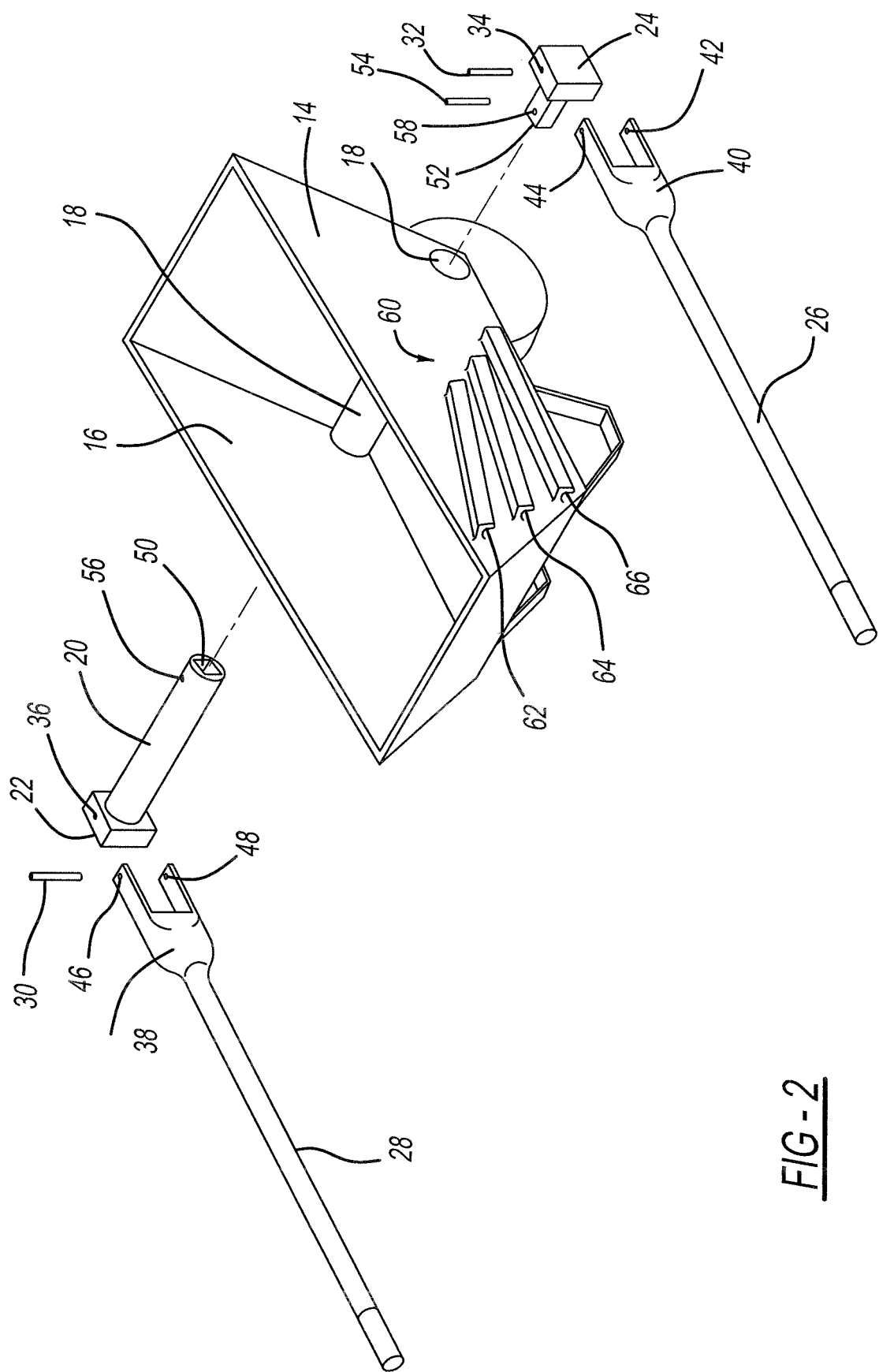
FIG. 2 is an exploded view showing the handle system of the present invention.

The following description of the preferred embodiment(s) is merely exemplary in nature and is in no way intended to limit the invention, its application, or uses.

A wheelbarrow having an adjustable handle is generally shown at 10. The wheelbarrow 10 has a bucket portion 12 having a pair of sides 14 and 16 and an axle accepting portion 18 therein. An axle member 20 is provided for insertion through the axle accepting portion 18. The axle member 20 has a pair of outer peripheral ends (22, 24) spaced on either side of the pair of sides 14, 16. A pair of handles (26, 28) are pivotally attached to each of the pair of outer peripheral ends 22, 24 by way of pivot pins 30 and 32 for allowing the handle 26, 28 to pivot away from the bucket portion 12 of the wheelbarrow 10. Pivot Pins 30 and 32 engage orifices (42, 44, 46, 48) in U-shaped yokes 38 and 40 and corresponding holes 34 and 36 in the end portions 22 and 24.

The axle 18 is a two piece assembly which includes and end square orifice 50 therein. The end portion 24 has an end portion 52 with square outer surfaces which fit in the orifice 50. A pin 54 is used to secure the portion 52 to the end portion 24 into the orifice 50 by insertion through the holes 56 and 58. The pins are preferably roll pins or the like although nuts and bolts screws rivets or other fasteners may also be used provided they provide the proper pivotal arrangement of the parts.

Figure 8:
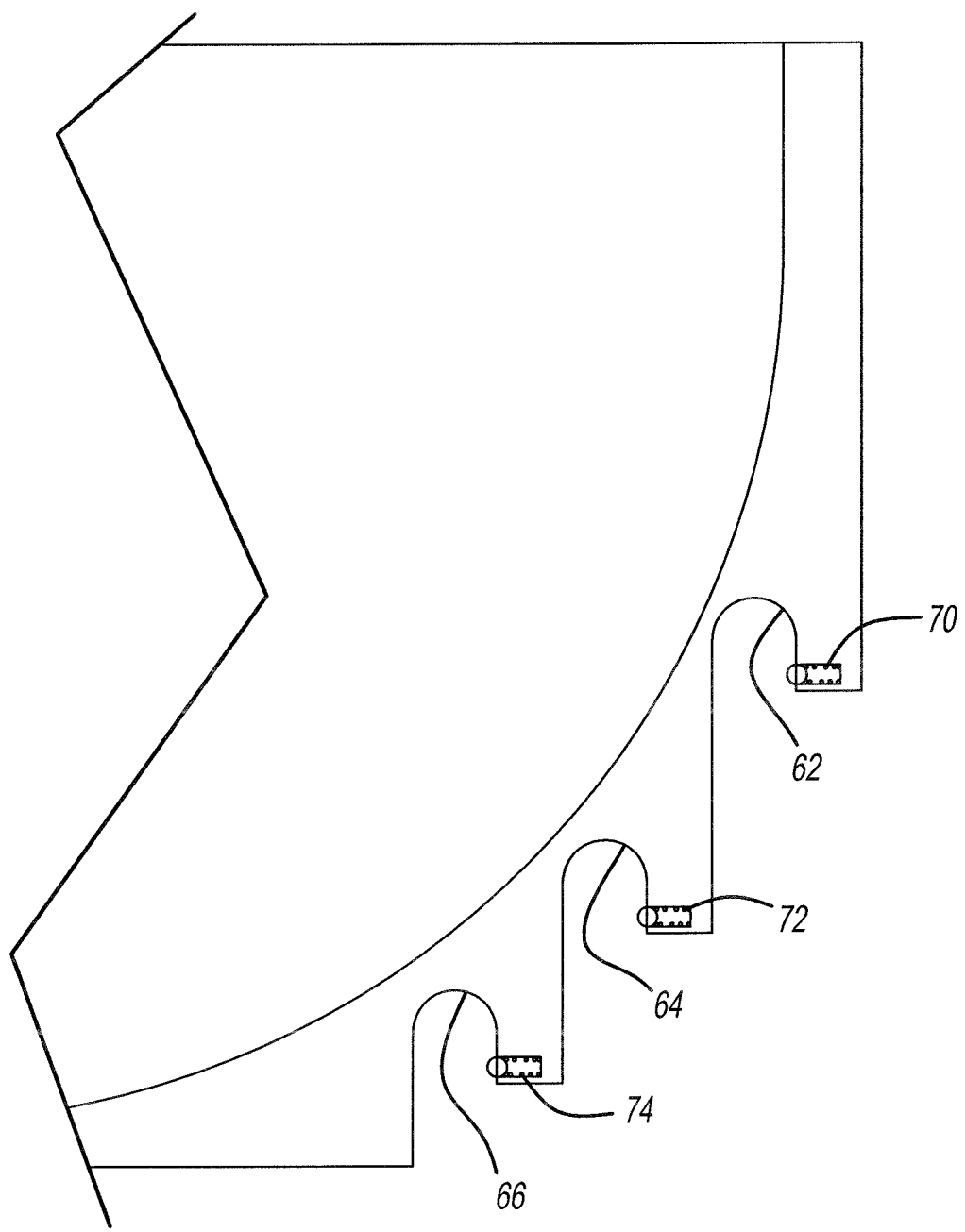
FIG. 8 is an end view partially broken away view, showing spring detents for holding the handle in place in the adjustable positions.

Each side 14 and 16 of the wheelbarrow 10 has surfaces defining a plurality of handle engaging areas generally indicated at 60 such that the handle may selectively be engaged in an area at a first position and selectively disengaged to move the handle to a second position. As shown in the figures three positional channels 62, 64 and 66 are provided with corresponding positioning channels on the other side 16 to allow the handles to be positioned in three different adjustable positions. AS shown in FIG. 8 spring loaded retainer pin assemblies 70, 72 and 74 hold the handles 26 and 28 in the slot after the adjustment is made.

Referring now to FIGS. 3-8 the handle is rotated downward out of the channel 62, 64 or 66 as shown by arrow 76 and is then rotated outwardly as shown by arrow 78 thereafter the handle is moved up or down (and in or out) into the desired elongated slot and forced upwardly into the slot to be locked by one of the pins such as 72 in FIG. 4.

As shown in FIG. 5 through 8 the various positions of the handles in each of the slots is schematically shown. As shown in FIG. 8 the handles move inward as they are positioned lower and progress wider apart as they are positioned upward.

In operation, the user may adjust the handles to his personal stature and comfort or for a particular purpose at hand. The user drops the handles down from the slot rotates them and selects the proper position by popping them in place over the detent ball. The detent ball holds the handles in place in the selected position. With a load in the wheelbarrow the slots are elongated for providing load bearing along substantially the entire length of the side of the wheelbarrow which provides for greater strength and stability while using the wheelbarrow.

Figure 10:
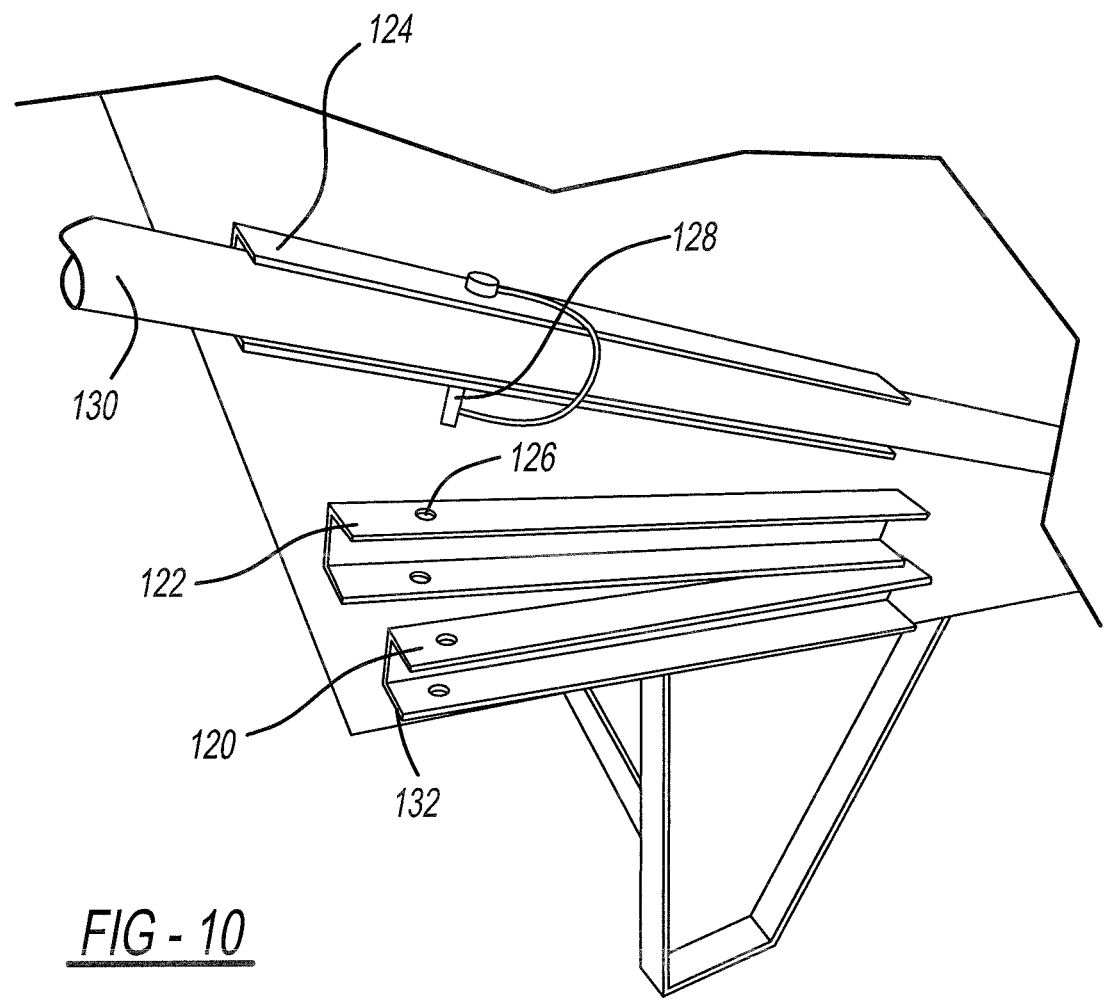

In an alternate embodiment illustrated in FIG. 10, releasable through pins 128 are used in the place of the spring loaded ball members to fixedly secure the handles 130 in place in the elongated slot 124 during use. In the embodiment shown, the pin 128 is oriented vertically. In an alternate embodiment (not shown), the pin is oriented horizontally. Thus a clevis pin or the like would be inserted through suitable holes 126 in the slots of the wheelbarrow and through the handle 130. In this manner the handle is retained and locked in place such that the handles will not accidentally disengage upon dumping of the wheelbarrow 132. The pins are removable or releasable for changing of the position of the handles after which time they may be repositioned for securing the handles in the other positions provided by slots 122, 120.

Figure 9:
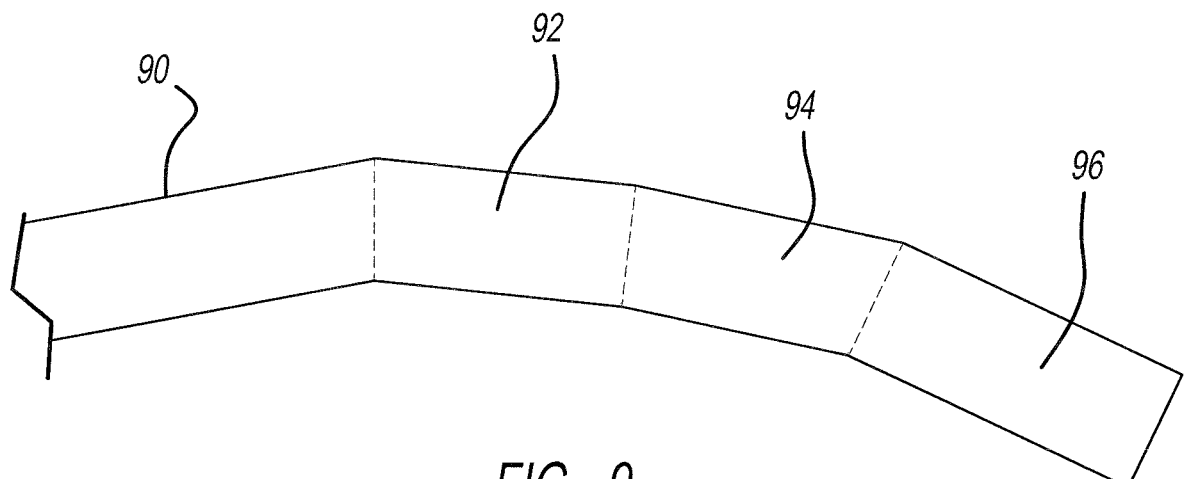
FIG. 9 is a detailed side view of an alternate embodiment handle end portion and, FIG. 10 is a partial perspective view of another alternate embodiment handle retainer of the present invention.

Referring now to FIG. 9 there is shown an embodiment with a handle configuration for the handles 90. The handle 90 includes three separate grip areas 52, 54 and 56. Each area is angled to provide optimum positioning of the handle portion for corresponding to whichever the position the handles are in on the wheelbarrow itself. Thus the wheel barrow can be used equally comfortably by the whole family with one handle "grip" properly angle for use by a child one for the wife and one for the man or whichever person in the family fits each position. Each handle portion is configured such that that portion of the handle is substantially horizontal (parallel with the ground) with the wheelbarrow in the stand alone position with the handle in a particular position. The handle portion 52 being for the lowest handle position and handle portion 56 being in the highest handle position with portion 54 between. Typically, the angle between the handle portions will be 5-8° every 6 in.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A wheelbarrow having an adjustable handle comprising:
    a wheelbarrow bucket portion having a pair of sides;
    a pair of handles pivotally attached to each of said pair of sides for allowing said handle to pivot away from said bucket portion of the wheelbarrow; and,
    each side of said wheelbarrow bucket portion having surfaces defining a plurality of handle engaging areas such that said handle may selectively be engaged in an area at a first position and selectively disengaged to move said handle to a second position and wherein said surfaces defining a plurality of handle engaging areas further comprising at least three (3) elongated slots configured in said bucket of the wheelbarrow for allowing vertical positions from a lower position progressively to an upward position.

2. The wheelbarrow of claim 1 wherein handles are connected together by an axle member.

3. The wheelbarrow of claim 2 wherein said wheelbarrow bucket portion has an axle accepting portion and wherein said axle member is inserted within an axle accepting portion of said wheelbarrow bucket portion.

4. The wheelbarrow of claim 1 wherein a pin retainer holds the handle in the handle engaging area.

5. The wheelbarrow of claim 4 wherein said pin is oriented vertically.

6. A wheelbarrow having an adjustable handle comprising:
    a wheelbarrow bucket portion having a pair of sides and an axle accepting portion therein;
    an axle member for insertion through the axle accepting portion, wherein said axle member has a pair of outer peripheral ends spaced on either side of said pair of sides;
    a pair of handles pivotally attached to each of said pair of outer peripheral ends for allowing the handle to pivot away from the bucket portion of the wheelbarrow;

each side of said wheelbarrows having surfaces defining at least three (3) vertically progressively spaced handle engaging areas such that the handle may selectively be engaged in an area at a first position and selectively disengaged to move the handle to different vertical positions; and a spring biased retainer to hold said handle in position.

7. The wheelbarrow of claim 6 wherein said surfaces defining a plurality of handle engaging areas further comprise at least three (3) elongated slots configured in said bucket portion of said wheelbarrow.

8. A wheelbarrow having an adjustable handle comprising:

a wheelbarrow bucket portion having a pair of sides;

a pair of handles pivotally attached to each of said pair of sides for allowing said handle to pivot away from said bucket portion of the wheelbarrow;

each side of said wheelbarrow bucket portion having surfaces defining a plurality of handle engaging areas such that said handle may selectively be engaged in an area at a first position and selectively disengaged to move said handle to a second position;

and wherein said handles are connected together by an axle member.

9. The wheelbarrow of claim 8 wherein said surfaces defining a plurality of handle engaging areas further comprising at least three (3) elongated slots configured in said bucket of the wheelbarrow for allowing vertical positions from a lower position progressively to an upward position.

10. The wheelbarrow of claim 8 wherein spring loaded detents hold the handles in one of said handle engaging areas.

11. The wheelbarrow of claim 8 wherein said handle engaging area is provided by a slot, each slot being configured at an angle for engaging the handle over the length of the slot.

12. The wheelbarrow of claim 11 wherein said slot runs substantially over the entire length of the side of the wheelbarrow.

13. The wheelbarrow of claim 8 wherein each handle has a handle end portion which includes grip portions corresponding to the number of positions for said handles wherein each grip portion is configured at an angle for being substantially parallel to the ground when said handle is in a corresponding vertical position.

14. The wheelbarrow of claim 8 wherein said handles are adjusted vertically.

15. The wheelbarrow of claim 14 wherein said handles are additionally adjusted horizontally.

16. The wheelbarrow of claim 8 wherein said handles are adjusted horizontally.

17. The wheelbarrow of claim 16 wherein said adjustment of the horizontal position of said handles is progressive.

18. The wheelbarrow of claim 8 having a retainer to retain said handle to said handle engaging area.

19. The wheelbarrow of claim 18 wherein said retainer is spring loaded.

20. The wheelbarrow of claim 8 wherein said handle end is progressively bent to provide a grip at a more approximate horizontal position when adjusted to a corresponding vertical position.

* * * * *